United States Patent
Krohn et al.

(10) Patent No.: US 7,391,451 B2
(45) Date of Patent: Jun. 24, 2008

(54) RECONFIGURABLE, MULTI-OUTPUT FRAME GRABBER FOR MACHINE VISION APPLICATIONS

(75) Inventors: Robert M. Krohn, Ithaca, NY (US); Steven J. Pratt, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 864 days.

(21) Appl. No.: 10/339,283

(22) Filed: Jan. 9, 2003

(65) Prior Publication Data

US 2004/0135907 A1 Jul. 15, 2004

(51) Int. Cl.
*H04N 5/202* (2006.01)

(52) U.S. Cl. ...................................... 348/254

(58) Field of Classification Search ................ 348/254, 348/255, 256, 222.1, 211.4; 382/237
See application file for complete search history.

(56) References Cited

U.S. PATENT DOCUMENTS

| 4,823,194 | A | * | 4/1989 | Mishima et al. ............. 382/190 |
| 5,067,019 | A | | 11/1991 | Juday et al. |
| 5,185,667 | A | | 2/1993 | Zimmermann |
| 5,247,166 | A | | 9/1993 | Cannon et al. |
| 5,416,392 | A | * | 5/1995 | Lee et al. ................. 318/568.1 |
| 5,712,922 | A | | 1/1998 | Loewenthal et al. |
| 5,717,469 | A | | 2/1998 | Jennes et al. |
| 6,026,177 | A | | 2/2000 | Mong et al. |
| 6,081,750 | A | | 6/2000 | Hoffberg et al. |
| 6,112,902 | A | | 9/2000 | Hayduchok et al. |
| 6,253,238 | B1 | | 6/2001 | Lauder et al. |
| 6,446,152 | B1 | * | 9/2002 | Song et al. .................. 375/371 |
| 6,930,709 | B1 | * | 8/2005 | Creamer et al. .......... 348/211.3 |
| 2003/0234876 | A1 | * | 12/2003 | Bloom et al. ............ 348/231.3 |

OTHER PUBLICATIONS

Donglai Xu, Said Boussakta, and John P. Bentley; "An FPGA-Based Low-Cost Frame Grabber for Image Processing Applications"; Dec. 2000; Electronics, Circuits and Systems; vol. 1; pp. 333-336.*
John Birkner; "Embedded RAM in FPGA Enables FIFO Applications"; Feb. 1, 1999; Electronic Engineering Times; p. 59.*
"The New Generation of Intelligent Frame Grabbers", May 31, 2001.
"Frame Grabbers & Machine Vision", Dec. 17, 2002.

* cited by examiner

*Primary Examiner*—Lin Ye
*Assistant Examiner*—Nicholas G Giles
(74) *Attorney, Agent, or Firm*—Tarolli, Sundheim, Covell & Tummino LLP

(57) ABSTRACT

An apparatus processes a video image. The apparatus includes an imaging device, a frame grabber device, and a host computer. The imaging device (20) produces a gray level image representing the video image. The frame grabber device conducts preprocessing functions on the gray level image and produces a plurality of image types from the gray level image. The host computer has a memory for storing the plurality of image types. The plurality of image types are transferred directly from the frame grabber device to the memory of the host computer.

15 Claims, 1 Drawing Sheet

RECONFIGURABLE, MULTI-OUTPUT FRAME GRABBER FOR MACHINE VISION APPLICATIONS

FIELD OF THE INVENTION

The present invention is directed to a video image acquisition system and, more particularly, a hardware device for processing an acquired video image.

BACKGROUND OF THE INVENTION

Video image acquisition systems, such as optical character recognition and bar code decoding, typically require intensive operations by a central processing unit. In such systems, preprocessing of raw image data is often utilized to enhance features, reduce noise, and compress image data. Additionally, multiple images may be generated from an acquired raw image to provide a distinctive and expanded data set for downstream processing.

SUMMARY OF THE INVENTION

To maximize the bandwidth of the central processing unit in a video image acquisition system, it would be desirable to dedicate image preprocessing to a hardware device disposed between an imaging acquisition device and the central processing unit of a host computer or similar device. Additionally, the hardware device may be able to transfer the processed data directly into the memory of the host computer without any intervention by the central processing unit. Further, the dedicated hardware device may also be reconfigurable in order to provide future operational enhancement of the algorithm and/or additional features with minimal additional cost.

In accordance with one feature of the present invention, an apparatus processes a video image. The apparatus includes an imaging device, a frame grabber device, and a host computer. The imaging device produces a gray level image representing the video image. The frame grabber device conducts preprocessing functions on the gray level image and produces a plurality of image types from the gray level image. The host computer has a memory for storing the plurality of image types. The plurality of image types are transferred directly from the frame grabber device to the memory of the host computer.

In accordance with another feature of the present invention, a method processes a video image. The method includes the steps of: capturing a first gray level image from the video image; processing the first gray level image during the capturing step, the processing step including the step of generating multiple images from the first image; and transferring data representing the first image and the multiple images directly to the memory of a host computer. The processing step is conducted by a field programmable gate array. The field programmable gate array is located physically apart from the host computer.

In accordance with still another feature of the present invention, an image processing system includes a camera, a frame grabber and a host computer. The camera electronically captures a physical image. The frame grabber processes the physical image and produces multiple data streams representing the physical image. The host computer has a memory for storing the data from the multiple data streams. The frame grabber serially transfers the multiple data streams directly to the memory of the host computer.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
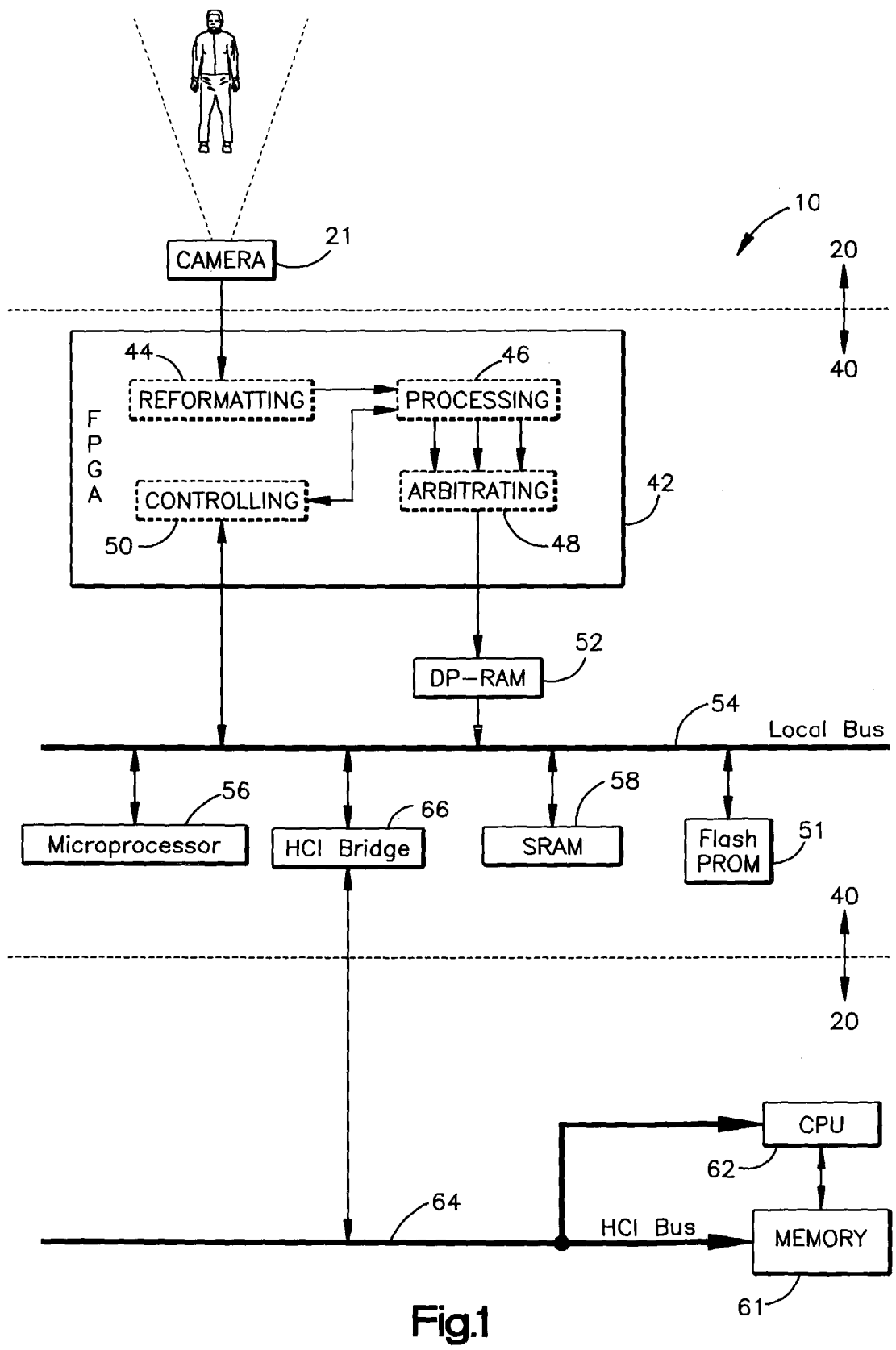
FIG. 1 is a schematic view of an apparatus in accordance with the present invention.

In accordance with the present invention, a video imaging system 10 includes a hardware device 40 for acquiring a video image from an imaging device 20 (such as a camera 21) and processing the image before sending the image to a host computer 60 or similar device (FIG. 1). Typically, the hardware device 40 may be an electronic control card for connecting to a main processor of the host computer 60. The hardware device 40, or frame-grabber, may have three basic characteristics.

Firstly, the frame grabber 40 may perform image-processing functions (i.e., binarization, noise reduction, background removal, etc.) simultaneously with the image being captured. These image processing functions may generate multiple image types in addition to the originally acquired image, or grayscale image.

Secondly, the frame grabber 40 may perform multiple serial or simultaneous direct access transmissions of the multiple image types to the memory 61 of the host computer 60. This results in down-stream applications that need no further processing of the different image types. This efficiency may free up processing resources to better run these applications. Furthermore, the frame grabber 40 may move each image type into an application specific buffer or buffers. In this way, the host computer 60 need not conduct block moves of video data from a receiving buffer to an application buffer.

Thirdly, the frame-grabber 40 may feature a field-programmable gate array (FPGA) 42. The field-programmable gate array 42 may allow reconfiguration of the frame grabber 40 without changing the physical hardware of the frame grabber.

More specifically, the field-programmable gate array 42 is programmable. As stated above, different configurations may be designed using the same physical hardware. As viewed in FIG. 1, internal to the field-programmable gate array 42, four major functions may be performed by four distinct sub-system modules: reformatting 44, processing 46, arbitrating 48, and controlling 50.

In the reformatting module 44, the video signal from the imaging device 20, or camera 21, is tied directly into the reformatting module within the frame grabber 40. The reformatting module 44 translates the video signal to a common format internal to the frame grabber 40. If a new video format is input into the frame grabber 40, only the reformatting module 44 would have to be tailored, or altered, to process that format.

In the processing module 46, a distinctive and expanded data set may be derived from the video signal through a wide-range of methods. The types and amount of processing are only limited to resources available on the field-programmable gate array 42. Some processing methods may include: Binarzation—converting 8-bit gray scale data to a 1-bit representation; Radiometric Correction—pixel-by-pixel correction for camera sensor anomalies and illumination anomalies; Resizing—downsampling or upsampling; Scan Line Reversal—reordering of the video data; Region Cropping; and Compression—eliminating redundancies in the input video data thereby reducing the output data. As viewed in FIG. 1, since most field-programmable gate array logic may be conducted in parallel, the processing module 46 may produce multiple simultaneous data streams as output signals to the arbitrating module 48.

In the arbitrating module 48, because there may be only one, limited path to a dual-port random access memory (DP-RAM) module 52, multiple data streams generated by the processing module 46 may be arbitrated to produce a single, serial output signal. The arbitrating module 48 may conduct some first-in-first-out (FIFO) storage to delay, or "hold-off", the other streams while one stream is being written to the DP-RAM module 52 as an output signal. The bandwidth to the DP-RAM module 52 should sustain the sum of the output streams generated by the processing module 46. Further, each data stream may be written to a specific partition within the DP-RAM module 52.

In the controlling module 50, registers may be a mechanism to connect a local microprocessor 56 to the field-programmable gate array 42 internal to the frame grabber 40. Through the registers, the local microprocessor 56 may monitor how much data is written to the DP-RAM module 52 for the purpose of controlling direct memory access to the host computer. Additionally, the registers may provide variables to the processing module 46 during the processing methods (i.e., resizing parameters, binarization thresholds, etc).

The DP-RAM module 52 acts as an intermediate buffer between the data signal(s) generated by the arbitrating module 48 and a local bus within the frame grabber 40 (for transmission to the host computer 60). Each output data signal may be stored in a specific partition within the DP-RAM module 52 in a circular manner. The size of these partitions may be much less than each complete image. The transmission to the host computer 60 by direct-memory access occurs at a rate greater than or equal to that at which the arbitrating module 48 can output to the DP-RAM module 52.

The local microprocessor 56 of the frame grabber 40 monitors and controls the direct memory access from the DP-RAM module 52 to the host computer 60 through the local bus 54. Additionally, the local microprocessor 56 provides a command interface between the host computer 60 and the frame grabber 40 for initiating captures and reading/writing processing parameters.

A synchronous random access memory (SRAM) module 58 resides on the local bus 54 and provides memory to store direct memory access (DMA) addressing information. The DMA addressing information specifies the addresses of the destination (on the host computer 60) and the addresses of the source data (from the DP-RAM module 52). Additionally, as stated above, the SRAM module 58 provides memory for temporary algorithm storage for the local microprocessor 56.

The local microprocessor code and field-programmable gate array configuration may be stored in a Flash PROM (programmable read only memory) module 51 in a non-volatile manner. The Flash PROM module 51 may be in communication with the local bus 54. When the entire system is powered on, the local microprocessor may execute the local microprocessor code and configure the field-programmable gate array 40 from the Flash PROM module 51. This type of non-volatile memory is typically re-programmable. Any updates and/or customized algorithms may thus be reprogrammed using the same physical hardware.

A host computer interface bus 64 provides the logic necessary to connect the interface bus with the local bus 54. A host computer interface (HCI) bridge 66 provides communication between the local bus 54 of the frame grabber 40 and the host computer interface bus 64 of the host computer 60. The frame grabber 40 thereby communicates with the memory 61 and the central processing unit 62 of the host computer 60 through the host computer interface bus 64. On-board communication registers are used (such as "doorbell" and "mailbox") to initiate commands between the hardware device 20 and the host computer 60.

The frame grabber 40 is essentially an independent device. Whether the host computer 60 is running Windows NT, Linux, UNIX, etc., the interface is identical. This type of structure thereby allows the same function call for any system configuration using multiple image capture. Several example function calls are described below:

VpCaptureModeSetup

Syntax:
   VP_RETURN_CODE VpCaptureModeSetup (HANDLEDeviceHandle,
     UINT32 NumberOfImages,
     IMAGE_DESC ImageDescList[ ]);

Description:
   Sets up a Video Processor for capturing images of desired types and sizes.

Parameters:
   DeviceHandle is the handle to a specific Video Processor.
   Number Of Images specifies the number of images to output for each capture (e.g., for each capture there will be two images: RawGray Uncompress and RawBinPack-Uncompress).
   ImageDescList[ ] is a pointer to an array of IMAGE_DESC structures that specify image specific parameters.

Comments:
   The IMAGE_DESC structure can be described by:
   typedef struct_image_desc}
     UINT32 Image Typ;
     UINT32 MaxSize;
   }IMAGE_DESC;
   ImageType is the code that specifies the type of image (e.g., packed binary, 7-bit gray plus 1-bit binary, or etc.).
   MaxSize specifies the maximum size of the image data in bytes (the size of the image data buffer must be a multiple of 4096 bytes).

VpCaptureGo

Syntax:
   VP_RETURN_CODE VpCaptureGo (HANDLEDeviceHandle,
     void* ImageBufList[ ]);

Description:
   Enables the Video Processor to capture an upcoming frame. This function is blocked until a frame is captured or another process issues VpCaptureAbort.

Parameters:
   DeviceHandle is the handle to a specific Video Processor.
   ImageBufList [ ] is a pointer to an array of image buffer pointers.

Comments:
   Each image buffer must begin on page (4-kbyte) boundaries and also be a multiple of 4096 bytes in size. The first 4096 bytes of each buffer consists of an IMAGE_INFO structure followed by reserved space. Image data, including headers (if applicable), is found at an offset 4096 bytes from the image buffer pointer.

The IMAGE_INFO structure can be described by:

```
typedef struct_image_info}
    UINT32 CaptureStatus;
    UINT32 Capture TimeStartSec;
    UINT32 Capture TimeStartUsec;
    UINT32 Capture TimeEndSec;
    UINT32 Capture TimeEndUsec;
    UINT32 ImageHeight;
    UINT32 ImageWidth;
    UINT32 StoredImageWidth;
    UINT32 StoredDataSize;
    UINT32 LetterId;
    UINT32 letterIdStatus;
    UINT32 ImageHeightDetected;
    UINT32 ClearRegionBlackCount;
} IMAGE_INFO;
```

CaptureStatus is the code that specifies the state of the image capture:

CaptureSuccess=0×1

HostBufferOverflow=0×2

LocalBufferOverflow=0×3

CaptureTimeStartSec indicates the capture start time (in seconds).
CaptureTimeStartUsec indicates the capture start time (in microseconds).
CaptureTimeEndSec indicates the capture stop time(in seconds).
CaptureTimeEndUsec indicates the capture stop time (in microseconds).
ImageHeight indicates the image height (in pixels) of the absolute image.
ImageWidth indicates the image width (in pixels) of the absolute image.
StoredImageWidth indicates the image width (in pixels) stored in the host buffer.
StoredDataSize indicates the size (in bytes) of the image data stored in the host buffer. This includes any header information, etc.
LetterId indicates the letter identification for the image captured.
LetterIdStatus indicates whether a letter identification was detected properly.

LetterIdOk=0×1

LetterIdError=0×2

ImageHeightDetected indicates a true image height (in pixels) detected by the processor.
ClearRegionBlackCount indicates how many black pixels are in a defined region.

VpCaptureModeClose

Syntax:
 VP_RETURN_CODE VpCaptureModeClose (HANDLEDeviceHandle);

Description:
 De-allocates all hardware resources used by the Video Processor in capture mode.

Parameters:
 DeviceHandle is the handle to a specific Video Processor.

VpDeviceControl

Syntax:
 VP_RETURN_CODE VpDeviceControl (HANDLEDeviceHandle,
    UINT16 VpCommand,
    UINT32 pParamIn[4],
    UINT32 pParamOUT[4],
    UINT32* pRetCode,
    UINT32 TimeoutValue);

Description:
 Performs low-level access to the Video Processor.

Parameters:
 DeviceHandle is the handle to a specific Video Processor.
 VpCommand is the low-level command to signal the Video Processor.
 pParamIn [4] is a pointer to an array of four input parameters.
 pParamOut [4] is a pointer to an array of four locations where the output parameters will be stored.
 pRetCode is a pointer to where the Video Processor return code is stored.
 TimeoutValue is the time in milliseconds to wait for a response from the Video Processor.

Some specific advantages to the system, apparatus, and method in accordance with the present invention are: different firmware may be used to accommodate different modes of operation; the hardware is field upgradeable without any specialized equipment; and an easy-to-program Application Program Interface (API) may support an unlimited number of image buffers employed in the application (image data may never need to be moved from the receiving buffer to an application buffer).

Some further specific advantage to the system, apparatus, and method in accordance with the present invention are: tag generation may create and insert a 32-bit image sequence number into the gray image and maintain the sequence number in non-volatile storage, incremented with every image; concurrent image processing may be performed (zero latency) as images are acquired (image data may be processed in real time as it arrives and moved to system memory with almost zero latency); image information (i.e., capture progress, cropping data, etc.) may be available to application software during, and after, the image is acquired (image information, such as the current acquired byte count, may be updated in real-time to enable concurrent processing and image acquisition); simultaneous generation and storage of multiple image representations (i.e., gray, binary, compressed, down-sampled, etc.; instead of the software subsystems copying the raw image data and reprocessing it into a new system buffer, the frame grabber may do all this with no wasted CPU cycles); and automatic image cropping.

Some still further specific advantage to the system, apparatus, and method in accordance with the present invention are: generation of application specific image formats (i.e., TIFF, BMP, custom, etc.; software conversion may not be necessary when the frame grabber does it automatically); application specific image information may be embedded into each image (i.e., sequence number, time-stamp, custom, etc.; if sequence numbers, time-stamps, or image related data are needed by the software application, the frame grabber may automatically place these in every image header); and image(s) may be stored into multiple user-specified buffers so that image data never needs to be moved (image data may need not be moved from temporary buffer space to application buffers; any quantity of buffers may be automatically used in a circular fashion).

From the above description of the invention, those skilled in the art will perceive improvements, changes and modifications. Such improvements, changes and modifications within the skill of the art are intended to be covered by the appended claims.

Having described the invention, the following is claimed:

1. An apparatus for processing a video image, said apparatus comprising:
    an imaging device for producing a gray level image representing the video image;
    a frame grabber device for conducting preprocessing functions on the gray level image and for producing a plurality of image types from the gray level image; and
    a host computer having a memory for storing the plurality of image types, the plurality of image types being transferred directly from said frame grabber device to said memory of said host computer.

2. The apparatus as set forth in claim 1 wherein said frame grabber device includes a reformatting module for converting the video image to a common format internal to said frame grabber device.

3. The apparatus as set forth in claim 2 wherein said frame grabber device includes a processing module for converting the video image to multiple unique representations.

4. The apparatus as set forth in claim 3 wherein said frame grabber device includes an arbitrating module for converting parallel signals from said processing module to a serial signal.

5. The apparatus as set forth in claim 4 wherein said frame grabber device includes a dual-port random access memory (DP-RAM) module for providing a buffer between said arbitrating module and said host computer.

6. The apparatus as set forth in claim 5 wherein said frame grabber device includes a local microprocessor for controlling the functioning of said frame grabber device.

7. The apparatus as set forth in claim 6 wherein said frame grabber device includes a synchronous random access memory (SRAM) module for storing address information.

8. The apparatus as set forth in claim 1 further including a host computer interface (HCI) bridge for providing communication between a local bus on said frame grabber device and a host computer interface bus on said host computer.

9. The apparatus as set forth in claim 1 wherein said frame grabber device includes a flash programmable read only memory (Flash PROM) for storing code and configuration data in a non-volatile manner.

10. The apparatus as set forth in claim 1 wherein said frame grabber device monitors and controls the transfer of the plurality of image types from said frame grabber device to said memory of said host computer.

11. A method for processing a video image, said method comprising the steps of:
    capturing a first gray level image from the video image;
    processing the first gray level image during said capturing step, said processing step including the step of generating multiple images from the first image; and
    transferring data representing the first image and the multiple images directly to the memory of a host computer,
    said processing step being conducted by a field programmable gate array, the field programmable gate array being located physically apart from the host computer.

12. The method as set forth in claim 11 further including the step of transferring the data representing the first image and the multiple images from the memory of the host computer to a central processing unit of the host computer.

13. The method as set forth in claim 11 further including the step of converting the first image and the multiple images from multiple parallel signals to a single serial signal.

14. The method as set forth in claim 11 further including the step of monitoring the functioning of the field programmable gate array by the host computer.

15. The method as set forth in claim 11 further including the step of reformatting the video image to a common format internal to the field programmable gate array.

* * * * *